United States Patent [19]
Fujii

[11] Patent Number: 4,901,442
[45] Date of Patent: Feb. 20, 1990

[54] VEHICLE WHEEL TOE-IN TESTING DEVICE

[75] Inventor: Hiroshi Fujii, Higashihiroshima, Japan

[73] Assignee: Mazda Motor Manufacturing (U.S.A.) Corporation, Flat Rock, Mich.

[21] Appl. No.: 238,815

[22] Filed: Aug. 31, 1988

[51] Int. Cl.⁴ .................... G01B 11/275; G01B 5/255; G01B 21/26

[52] U.S. Cl. ................................. 33/203.13; 33/203; 33/203.15

[58] Field of Search ................ 33/203, 203.13, 203.14, 33/203.15, 203.17, 203.21; 356/152, 155

[56] References Cited

U.S. PATENT DOCUMENTS

| | | | |
|---|---|---|---|
| 3,187,440 | 6/1965 | Merrill et al. | 33/203.13 |
| 3,453,740 | 7/1969 | Sakamoto | 33/203 |
| 3,546,782 | 12/1970 | Pereue et al. | 33/203.17 |
| 3,908,280 | 9/1975 | Murakami et al. | 33/203.13 |
| 4,429,467 | 2/1984 | Murata et al. | 33/203 |
| 4,443,951 | 4/1984 | Elsasser et al. | 33/203.13 |
| 4,457,075 | 7/1984 | Murata | 33/203.15 |
| 4,631,832 | 12/1986 | Schraumen et al. | 33/203.14 |
| 4,679,327 | 7/1987 | Fouchey et al. | 33/203.13 |

FOREIGN PATENT DOCUMENTS

3225899 12/1984 Fed. Rep. of Germany .

*Primary Examiner*—William A. Cuchlinski, Jr.
*Assistant Examiner*—Thomas B. Will
*Attorney, Agent, or Firm*—Wenderoth, Lind & Ponack

[57] ABSTRACT

The present invention is drawn to a vehicle wheel testing device for detecting the alignment of a vehicle wheel rotating at a testing position on support rollers. The device includes a base plate slidably mounted in the device for sliding toward and away from the vehicle wheel, a sensor member carried by the base plate and mounted to the base plate for moving relative to the base plate, an urging device operatively connected to the base plate for urging the sensor member toward the vehicle wheel, and a control device operatively connected to the urging device. The control device controls the urging device to place the sensor member in contact with the vehicle wheel under a relatively low force during a start-up stage of the operation during which the vehicle wheel is rotated and shifts laterally on support rollers toward a testing position due to the toe-in of the vehicle wheel, and for subsequently controlling the urging device to urge the sensor member against the vehicle wheel under a relatively high force during a testing stage in which a detecting device detects the relative position of the sensor member to the base plate. Under the relatively low force, the vehicle wheel can reach the testing position relatively quickly resulting in a lowered overall testing time.

13 Claims, 5 Drawing Sheets

VEHICLE WHEEL TOE-IN TESTING DEVICE

BACKGROUND OF THE INVENTION

The present invention relates to a vehicle wheel testing device for detecting the alignment of a vehicle wheel rotating at a testing speed, and in particular, to a toe-in tester for detecting the toe-in of a wheel of a vehicle as the vehicle moves along a production line.

Prior art vehicle wheel alignment testing devices are known for detecting the toe-in and/or camber angles of vehicle wheels while the vehicle wheels rotate at a testing speed on a pair of support rollers. These prior art testing devices typically comprise a sensor plate with or without a plurality of rollers that is mounted in the device for relative movement and is initially brought into contact with the vehicle wheel. The wheel is then rotated and accelerated. As the wheels begin rotating, the toe-in of the wheels causes the vehicle to shift laterally on the support rollers until the vehicle becomes disposed at a testing position. Once the vehicle is in the testing position, relative movement of the sensor plate and/or rollers mounted thereto is then sensed to determine the toe-in and/or camber angles of the vehicle wheel.

However, a problem in these prior art devices results from the fact that, since a relatively large force is exerted on the vehicle wheels by the sensor plate and/or rollers prior to acceleration of the vehicle wheels, when the wheels begin accelerating, the lateral movement of the vehicle wheels on the support rollers toward the testing position is inhibited. As a result, in the prior art devices, it takes at least one minute for the vehicle wheel to reach the testing position after the sensor plate and/or rollers have been urged into contact with the vehicle wheel during a set-up stage. Such is not suitable for testing the wheels of a vehicle which is traveling along a high speed production line.

SUMMARY OF THE INVENTION

Accordingly, an object of the present invention is to provide a vehicle wheel testing device for detecting the alignment of a rotating vehicle wheel in which the vehicle wheel can attain a testing position on support rollers, after a sensor member has been urged into contact with the vehicle wheel, in a period of time which reduces the total test time to under 10 seconds.

To attain such an object, the present invention is characterized in the provision of control means which first urges a sensor member into contact with the vehicle wheel under a relatively low force while the vehicle wheel begins to rotate so as not to overly retard the lateral movement of the vehicle wheel on the support rollers. Once the vehicle wheel has reached the testing position, the control means causes the sensor member in contact with the vehicle wheel to be urged thereagainst under a relatively high force which is sufficient to facilitate the testing thereof. The toe-in can then be determined in approximately 5 seconds during this testing stage. In this way, the total testing time can be reduced to under 10 seconds.

BRIEF DESCRIPTION OF THE DRAWINGS

The present invention and further objects and features thereof will be better understood by those of ordinary skill in the art reviewing the following detailed description of the preferred embodiment taken in conjunction with the accompanying drawings, in which.

DETAILED DESCRIPTION OF THE PREFERRED EMBODIMENTS

Figure 1:
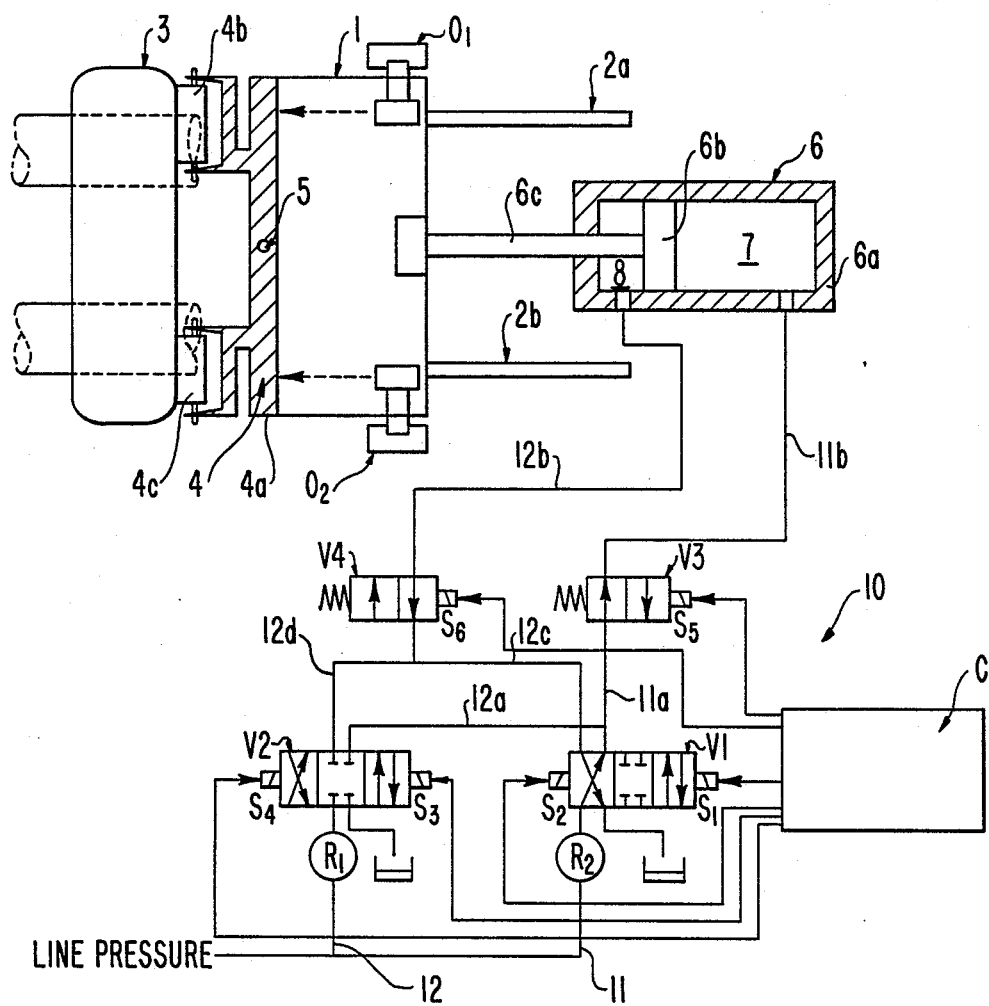
FIG. 1 is a schematic plan diagram of an apparatus according to the present invention showing a set-up stage during the operation of the present invention.

Referring now to FIG. 1. the present invention comprises a base plate 1 slidably mounted in the device and guide means 2a, 2b for slidably guiding the base plate toward and away from a vehicle wheel 3. The vehicle wheel 3 is supported atop support rollers (shown in phantom lines) so as to rotate thereon when accelerated. A sensor member, generally indicated at 4, is carried by the base plate 1 for sliding therewith, and mounting means 5 mounts the sensor member 4 to the base plate 1 for allowing the sensor member to move relative to the base plate 1. The sensor member 4 comprises a roller supporting plate 4a and a plurality of rollers 4b, 4c rotatably mounted to the roller-supporting plate 4a.

An urging means, generally indicated at 6, is operatively connected to the base plate 1 for urging the base plate and the sensor member 4 toward the vehicle wheel to place the sensor member 4 in contact with the vehicle wheel and for urging the sensor member 4 against the vehicle wheel. The urging means comprises a piston/cylinder device including a cylinder 6a, a piston 6b slidably received in the cylinder 6a, and a piston rod 6c connected to the piston 6b and the base plate 1. A first chamber 7 is defined between the cylinder and one side of the piston 6b while a second chamber 8 is defined between the cylinder 6a and the other side of the piston 6b. As is evident from the Figures, pressure generated in the first chamber 7 causes the piston 6b to slide in the cylinder 6a in a first direction (to the left in the Figures) in which the base plate 1 is moved toward the vehicle wheel 3 via piston rod 6c, and fluid pressure generated in the second chamber 8 causes the piston 6b to slide in the cylinder 6a in a direction (to the right in the Figures) in which the base plate 1 is moved away from the vehicle wheel via piston rod 6c.

Control means, generally indicated at 10, is operatively connected to the urging means 6 for controlling the urging means to place the sensor member 4 in contact with the vehicle wheel during a set-up stage, for controlling the urging means 6 to urge the sensor member 4 in contact with the vehicle wheel against the vehicle wheel with an initial relatively low force as the vehicle wheel is rotationally accelerated and shifts laterally on the support rollers during a start-up stage, and for subsequently controlling the urging means to urge the sensor member 4 against the vehicle wheel with a relatively high testing force that is higher than said initial force, once the shifting of the vehicle wheel on the support rollers is completed during a testing stage. The control means then controls the urging means 6 to remove the sensor member 4 from the vehicle wheel once the testing is completed.

The control means comprises a high pressure fluid line 11 in operative hydraulic communication with the first chamber 7 for passing high pressure fluid from a fluid source (not illustrated) to the first chamber (via lines 11a, 11b), and a low pressure fluid line 12 in operative hydraulic communication with the first chamber 7 (via lines 12a, 11a, 11b) for passing low pressure fluid to the first chamber 7 from a fluid pressure source. Pressure regulating means $R_1$, $R_2$ regulates the pressure in the high pressure fluid line 11 and the low pressure fluid line 12. In the preferred embodiment, the pressure regulator $R_2$ of the high pressure fluid line regulates the pressure of the fluid passing therein to 3 kg/cm$^2$ while the pressure regulator $R_1$ of the low pressure line 12 regulates the pressure of fluid flowing therein to 1kg/cm$^2$.

The control means further comprises a first valve V1 operatively hydraulically connected between the high pressure fluid line 11 and the first chamber 7 via lines 11a and 11b, and a second valve V2 operatively hydraulically connected between the low pressure fluid line 12 and the first chamber 7 via lines 12a, 11a and 11b.

The second chamber 8 is also in operative hydraulic communication with the high fluid pressure line 11 through said first valve V1 via lines 12b and 12c, and the second chamber 8 is in operative hydraulic communication with the low pressure fluid line 12 through the second valve V2 via lines 12b, 12d. Further, the control means comprises a third valve V3 which is operatively hydraulically connected between the first valve V1 and the first chamber 7 via lines 11a, 11b, and also between the second valve V2 and the first chamber 7 via lines 12a, 11a and 11b. A fourth valve V4 is operatively hydraulically connected between the second valve V2 and the second chamber 8 via lines 12d, 12b and between the second chamber 8 and the first valve V1 via lines 12b, 12c.

As illustrated in the Figures, the valves V1–V4 of the present invention are multi-position directional flow control valves having respective solenoids $S_1$–$S_6$ that actuate the valves to the positions shown in the Figures. A controller C is operatively connected to the solenoids $S_1$–$S_6$ of the valves V1–V4 for actuating the valves during the operation of the present invention which will now be described with reference to FIGS. 1–3, 4A and 4B.

FIG. 1 shows a set-up stage at which the sensor member 4, and in particular the rollers 4b, 4c, are moved into contact with the vehicle wheel 3 under a relatively high force. In FIG. 1, valve V1 is actuated by controller C to an open position thereof (by switching $S_1$ OFF and $S_2$ ON) while valve V3 is actuated to a first position thereof (by switching $S_5$ OFF) whereby fluid from high pressure line 11 is allowed to pass into chamber 7 via lines 11A, 11B thereby generating a relatively high pressure in chamber 7 which causes the piston 6b to slide to the left in the Figure and urge rollers 4b, 4c into contact with the vehicle wheel 3. Valve V4 is actuated to a second position (by switching $S_6$ ON) thereof and valve V2 is in a closed position thereof (by switching $S_3$ and $S_4$ OFF) whereby fluid from chamber 8 is directed through lines 12b and 12c to a drain or sump via valve V1. At this time, the vehicle wheel is not rotating.

Figure 2:
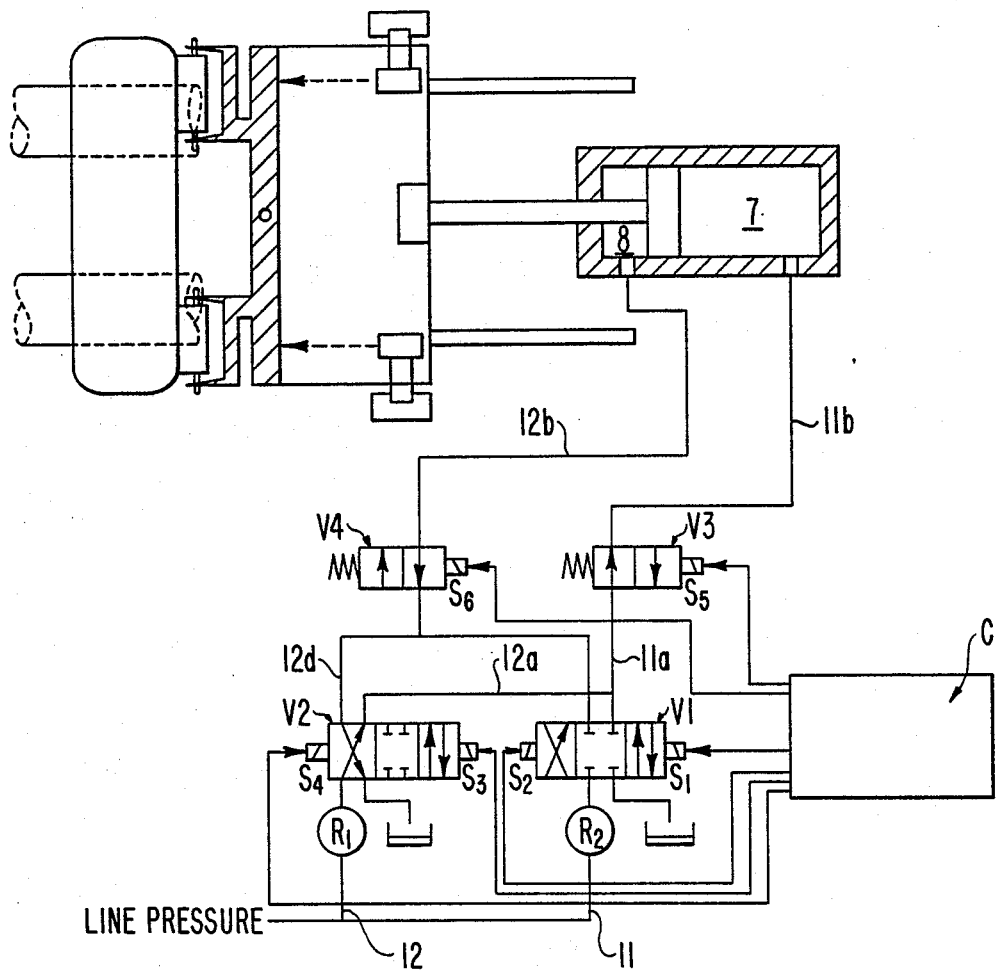
FIG. 2 is a schematic plan diagram of an apparatus of FIG. 1 but showing a start-up stage during the operation of the apparatus of the present invention at which the vehicle wheel begins to rotate and shift laterally toward a testing position on support rollers.

Turning now to FIG. 2, the sensor member 4, now in contact with the vehicle wheel 3, is urged thereagainst under a relatively low force. The controller C actuates valve V1 to a closed position thereof (by switching $S_2$ OFF) and valve V2 to an open position thereof (by switching $S_3$ ON) whereby fluid pressure from the low pressure line 12 is directed to chamber 7 via line 12a, valve V3 which remains in the first position thereof, and line 11b. The drain or sump remains in communication with chamber 8 via line 12b, valve V4 which remains in the second position thereof, line 12d and valve V2 now in the open position thereof. At this time, the vehicle wheel begins to rotate and is accelerated toward the testing speed. Because of the relatively low force at which the sensor member 4 is urged against the vehicle wheel 3, the vehicle wheel can easily shift laterally on the support rollers to a testing position in approximately 3 seconds.

Figure 3:
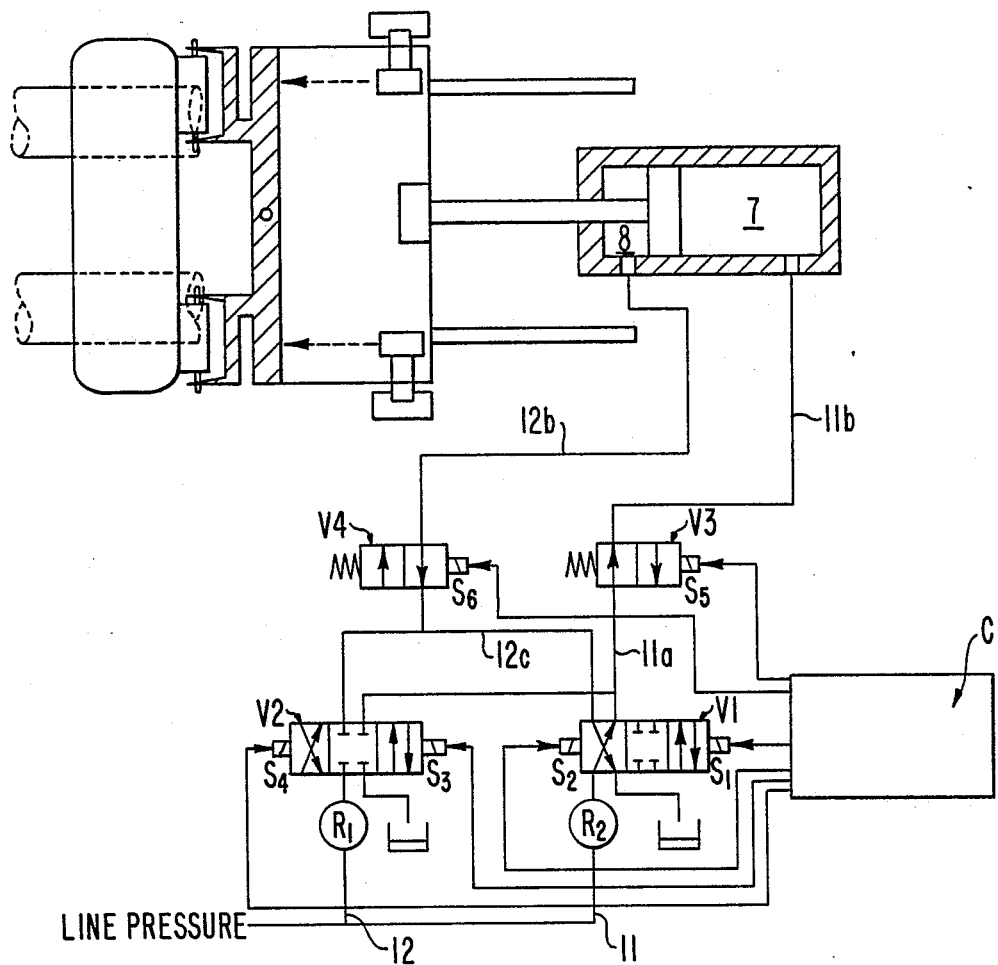
FIG. 3 is a schematic plan diagram of the apparatus of FIG. 1 but showing the operation during a testing stage thereof during which the alignment of the vehicle wheel is detected once the vehicle wheel has reached the testing position.

Turning now to FIG. 3, once the vehicle wheel has reached the testing position, the sensor member 4 is urged against the vehicle wheel 3 under a relatively high force which is larger than the force at which the sensor member 4 was previously urged against the vehicle wheel during the start-up stage shown in FIG. 2. During this testing stage, the position of the valves V1–V4 are actuated to the same positions as those shown in FIG. 1 in the set-up stage. Therefore, again, high pressure fluid is directed to chamber 7 from high fluid pressure line 11. The valves remain in these positions during the testing stage for approximately 5 seconds while the actual detection of the alignment of the vehicle wheel 3 is performed.

The detection is performed by detecting means comprising a pair of spaced apart optical detectors $O_1$, $O_2$ each of which is mounted in the device at a respective location spaced from the sensor member 4. Each optical sensor $O_1$, $O_2$ enses the distance between the location at which the sensor is mounted in the device and the sensor member 4. As the sensor member 4 is moved relative to the base plate 1 via mounting means 5, the respective distances sensed by optical sensors $O_1$, $O_2$ are used to determine the alignment of the vehicle wheel 3. When testing for the toe-in of the vehicle wheel 3, the mounting means 5, as shown in the Figures, comprises a vertically extending pivot pin about which the sensor member 4 can rotate relative to the base plate 1. After the lapse of approximately 5 seconds, i.e. after the testing stage is completed during which the alignment of the vehicle wheel is detected, the sensor member 4 is moved away from the vehicle wheel during a removal stage which can be either a low pressure removal mode at which the sensor member 4 is removed from the vehicle wheel under a relatively low force and therefore at a relatively low speed or a high pressure removal mode during which the sensor member is removed from the vehicle wheel under a relatively high force at a relatively high speed.

Figure 4A:
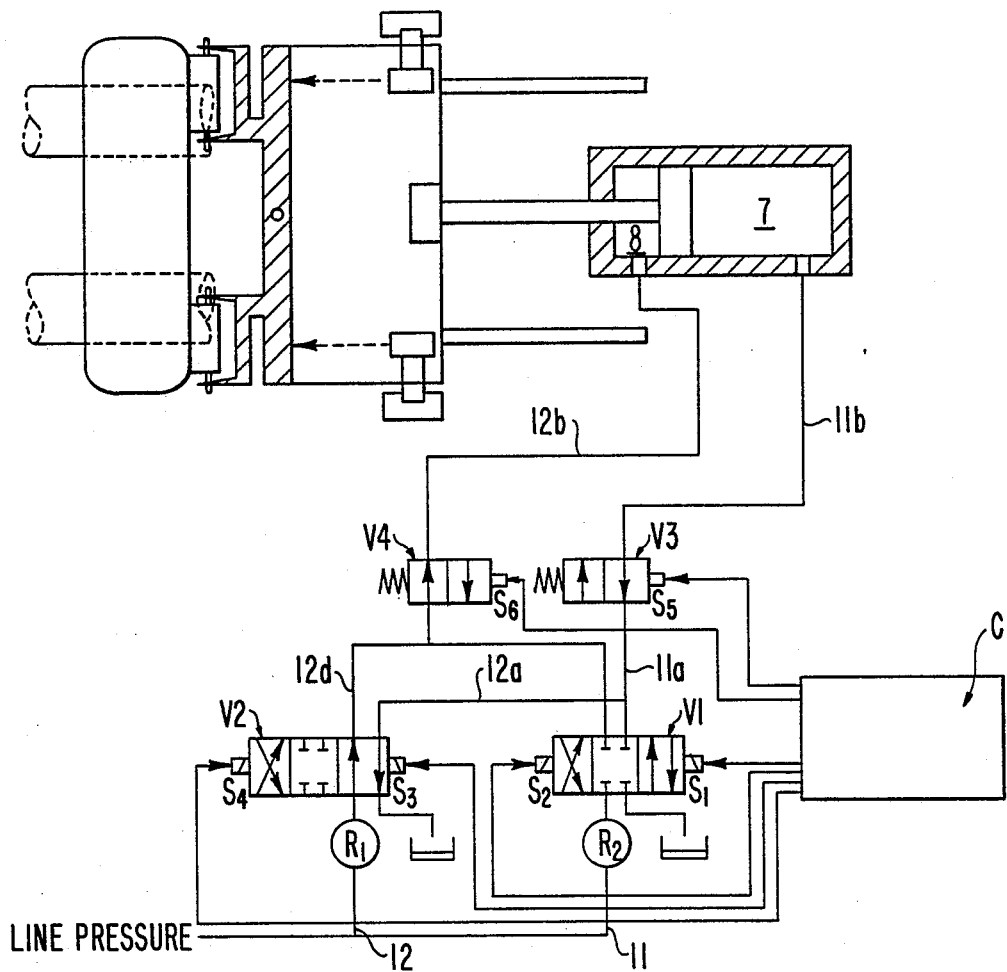
FIGS. 4A and 4B are respective schematic plan diagrams of the apparatus of FIG. 1 but showing the operation during alternative modes of a removal stage.

FIG. 4A shows the low pressure removal mode. As can be seen in FIG. 4A, valve V1 is actuated to the closed position thereof (by switching $S_2$ OFF) while valve V2 is actuated to a drain position thereof (by switching $S_3$ ON), and valve V3 is actuated to a second position thereof (by switching $S_5$ ON) while valve V4 is actuated to a first position thereof (by switching $S_6$ OFF). Thus, fluid flowing in the low pressure line 12 passes through valve V2 to chamber 8 via line 12d, valve V4 and line 12b while fluid in chamber 7 is drained via line 11b, valve V3, line 11a, line 12a and valve V2.

Figure 4B:
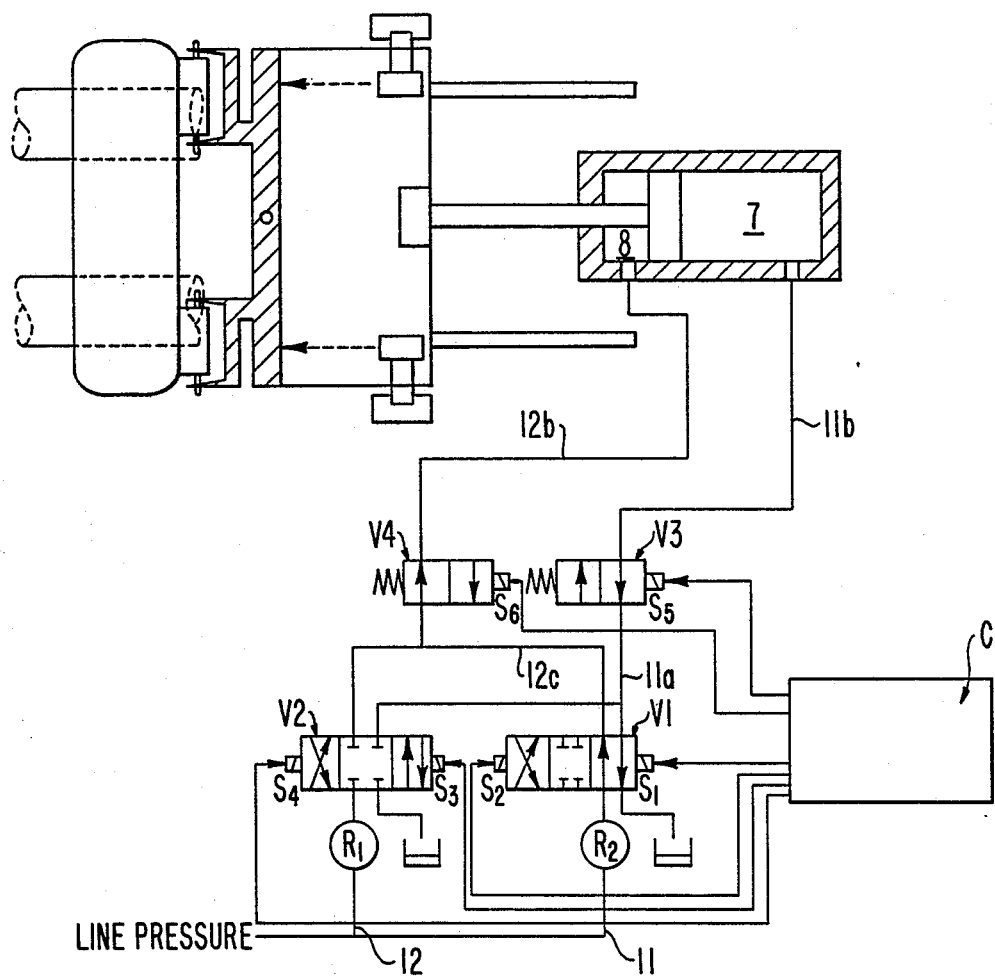

On the other hand, when it is desired to remove the sensor member 4 from the vehicle wheel under a relatively high force in a high pressure removal mode, as shown in FIG. 4B, valve V1 is moved to a drain position thereof (by switching $S_1$ ON and $S_2$ OFF) while valve V2 remains in the closed position thereof. Valve V3, as in the low pressure removal mode, is actuated to the second position thereof (by switching $S_5$ ON), while valve V4 is actuated to the first position thereof (by switching $S_6$ OFF). Thus, fluid pressure in the high pressure fluid line 11 passes to the high pressure chamber 8 via valve V1, lines 11a, 12c, valve V4 and line 12b while fluid in chamber 7 is communicated with the drain or sump via line 11b, valve V3, line 11a and valve V1.

The present invention has been described above in detail with reference to a preferred embodiment of the present invention. Various changes and modifications in the present invention may become apparent to those of ordinary skill in the art. Therefore, the above description is not intended to limitative of the present invention but merely illustrative thereof, the invention solely being limited by the appended claims.

What is claimed is:

1. A vehicle wheel testing device for detecting the alignment of a rotating vehicle wheel, said device comprising:
    a base plate slidably mounted in the device, and guide means for slidably guiding said base plate toward and away from the vehicle wheel;
    a sensor member carried by said base plate for sliding therewith, and mounting means mounting said sensor member on said base plate for allowing relative movement therebetween;
    urging means operatively connected to said base plate for urging said base plate and said sensor member toward the vehicle wheel to place said sensor member in contact with the vehicle wheel and for urging said sensor member against the vehicle wheel;
    control means operatively connected to said urging means for controlling said urging means to place said sensor member in contact with the vehicle wheel during a set-up stage, for controlling said urging means to urge said sensor member contacting the vehicle wheel against the vehicle wheel with an initial relatively low force as the vehicle wheel is rotationally accelerated during a start-up stage, and for subsequently controlling said urging means to urge said sensor member contacting the vehicle wheel against the vehicle wheel with a relatively high testing force that is higher than said initial force during a testing stage; and
    detecting means for detecting the position of said sensor member relative to said base plate during said testing stage.

2. A vehicle wheel testing device as claimed in claim 1,
    wherein said urging means comprises a cylinder, a piston slidably received in said cylinder, a first chamber defined between said cylinder and one side of said piston, a second chamber defined between said cylinder and the other side of said piston, and a piston rod connected to said base plate and said piston,
    fluid pressure generated in said first chamber causing said piston to slide therein in a first direction in which said base plate is moved toward the vehicle wheel via said piston rod, and fluid pressure generated in said second chamber causing said piston to slide therein in a second direction in which said base plate is moved away from the vehicle wheel via said piston rod, and
    said control means comprises a high pressure fluid line in operative hydraulic communication with said first chamber for passing high pressure fluid to said first chamber, a low pressure fluid line in operative hydraulic communication with said first chamber for passing low pressure fluid to said first chamber, a first valve operatively hydraulically connected between said high pressure fluid line and said first chamber, said first valve movable between an open position at which said high pressure fluid line is open to said first chamber and a closed position at which said high pressure fluid line is closed to first chamber, a second valve operatively hydraulically connected between said low pressure fluid line and said first chamber, said second valve movable between an open position at which said low pressure line is open to said first chamber and a closed position at which said low pressure line is closed to said first chamber, and a controller for positioning said first valve in said closed position thereof and said second valve in said open position thereof during said start-up stage and for subsequently positioning said first valve in said open position thereof and said second valve in said closed position thereof during said testing stage.

3. A vehicle wheel testing device as claimed in claim 2,
    wherein said controller positions said first valve in said open position thereof and said second valve in said closed position thereof for controlling said urging means to urge said sensor member into contact with the vehicle wheel under said relatively high force prior to said initial testing stage during a set-up stage.

4. A vehicle wheel testing device as claimed in claim 2,
    wherein said second chamber is in operative hydraulic communication with said high and said low fluid pressure lines through said first and said second valves, respectively,
    said control means further comprises a third valve operatively hydraulically connected between said first valve and said first chamber and also between said second valve and said first chamber, and a fourth valve operatively hydraulically connected between said second valve and said second chamber and also between said first valve and said second chamber,
    said third valve being movable between a first position at which fluid flowing through one of said first and said second valves is allowed to pass to said first chamber and a second position at which fluid in said first cylinder is allowed to pass toward one of said first and said second valves,
    said fourth valve being movable between a first position at which fluid flowing through one of said first and said second valves is allowed to pass to said second chamber and a second position at which the fluid in said second chamber is allowed to pass to one of said first and said second valves, said first valve is further movable to a drai position at which fluid is directed therethrough from said high pressure line toward said fourth valve and from said third valve toward a drain, said second valve is further movable to a drain position at which fluid is directed therethrough from said low pressure line toward said fourth valve and from said third valve toward a drain, and said controller positions said third valve in said first position thereof and said fourth valve in said second position thereof during both said start-up and said testing stages, and positions said valves in one of a low and a high pressure removal mode after said testing stage is completed for generating fluid pressure in said second chamber during a removal stage that moves said sensor member out of contact with the vehicle wheel, said first valve being in said closed position thereof, said second valve being in said drain position thereof, said third valve being in said second position thereof and said fourth valve being in said first position thereof in said low pressure removal mode, and said first valve being in said drain position thereof, said second valve being in said closed position thereof, said third valve being in said second position thereof and said fourth valve being in said first position thereof in said high pressure removal mode.

5. A vehicle wheel testing device as claimed in claim 2, wherein each of said valves is a solenoid operated valve.

6. A vehicle wheel testing device as claimed in claim 3, wherein each of said valves is a solenoid operative valve.

7. A vehicle wheel testing device as claimed in claim 4, wherein each of said valves is a solenoid operated valve.

8. A vehicle wheel testing device as claimed in claim 1, wherein said detecting means comprises a pair of spaced apart optical detectors each of which is mounted in the device at a respective location spaced from said sensor member for sensing the distance between said location and said sensor member.

9. A vehicle wheel testing device as claimed in claim 1, wherein said mounting means comprises a pivot pin about which said sensor member is pivotable relative to said base plate, said pivot pin extending in a direction perpendicular to the axis about which the vehicle wheel rotates when tested.

10. A vehicle wheel testing device as claimed in claim 9, wherein said pivot pin extends vertically.

11. A vehicle wheel testing device as claimed in claim 2, wherein said pressure fluid lines comprise pressure regulating means for regulating the pressure of fluid flowing through said high pressure fluid line to a pressure that is greater than the pressure of fluid flowing through said low pressure fluid line.

12. A vehicle wheel testing device as claimed in claim 11, wherein said pressure regulating means comprises a pressure regulator disposed in each of said high and said low pressure fluid lines.

13. A vehicle wheel testing device as claimed in claim 1, wherein said sensor member comprises a roller-supporting plate, and a plurality of rollers rotatably mounted to said roller-supporting plate at respective locations thereon for engaging the vehicle wheel in rolling contact therewith.

* * * * *